United States Patent
Kamarthi et al.

(10) Patent No.: US 12,353,387 B1
(45) Date of Patent: Jul. 8, 2025

(54) MULTI-COHORT REPLAY STORAGE AND RETROSPECTIVE ANOMALY DETECTION ANALYSIS

(71) Applicant: Conviva Inc., Foster City, CA (US)

(72) Inventors: Harshavardhan Kamarthi, Atlanta, GA (US); Harshil Shah, San Francisco, CA (US); Yan Li, Foster City, CA (US); Bodicherla Aditya Prakash, Marietta, GA (US); Vyas Sekar, Foster City, CA (US)

(73) Assignee: Conviva Inc., Foster City, CA (US)

( * ) Notice: Subject to any disclaimer, the term of this patent is extended or adjusted under 35 U.S.C. 154(b) by 0 days.

(21) Appl. No.: 18/883,772

(22) Filed: Sep. 12, 2024

Related U.S. Application Data

(60) Provisional application No. 63/650,309, filed on May 21, 2024, provisional application No. 63/538,768, filed on Sep. 15, 2023.

(51) Int. Cl.
*G06F 16/22* (2019.01)
*G06F 16/242* (2019.01)
*G06F 16/2455* (2019.01)
*H04L 41/0631* (2022.01)

(52) U.S. Cl.
CPC ........ *G06F 16/2246* (2019.01); *G06F 16/244* (2019.01); *G06F 16/24568* (2019.01); *H04L 41/0631* (2013.01)

(58) Field of Classification Search
CPC .............. G06F 16/2246; G06F 16/244; G06F 16/24568; G06F 16/2477; H04L 41/0631
See application file for complete search history.

(56) References Cited

U.S. PATENT DOCUMENTS

| | | | | |
|---|---|---|---|---|
| 5,822,751 | A * | 10/1998 | Gray | G06F 16/24556 701/4 |
| 9,398,347 | B2 * | 7/2016 | Jadallah | H04L 65/1094 |
| 11,044,533 | B1 * | 6/2021 | Li | H04L 41/064 |
| 11,336,506 | B1 * | 5/2022 | Li | H04N 21/2402 |
| 11,621,904 | B1 * | 4/2023 | Matthews | H04L 43/10 709/241 |
| 2005/0065910 | A1 * | 3/2005 | Welton | G06F 16/2264 |
| 2018/0048527 | A1 * | 2/2018 | Ganjam | H04L 61/5007 |
| 2020/0012541 | A1 * | 1/2020 | Lube | G06F 9/542 |
| 2022/0129456 | A1 * | 4/2022 | Conradi | G06F 16/248 |
| 2023/0205193 | A1 * | 6/2023 | Lavrentyev | G05B 23/0221 702/183 |

OTHER PUBLICATIONS

Rollup and Cube. Archived at archive.org on Feb. 13, 2021 [retrieved on Nov. 14, 2024]. data.world. https://web.archive.org/web/20210213092722/https://docs.data.world/documentation/sql/concepts/advanced/ROLLUP_and_CUBE.html (Year: 2021).*

(Continued)

*Primary Examiner* — James E Richardson
(74) *Attorney, Agent, or Firm* — Van Pelt, Yi & James LLP

(57) ABSTRACT

Facilitating analytics such as retrospective analysis includes ingesting session data. It further includes summarizing the session data and generating leaf-level summarizations of leaf groups present in the session data. It further includes storing the leaf-level summarizations. It further includes deriving parent-level summarizations for a parent group from leaf-level summarizations of leaf groups that are children of the parent group.

18 Claims, 6 Drawing Sheets

(56) References Cited

OTHER PUBLICATIONS

Ben-Basat et al. Heavy Hitters in Streams and Sliding Windows. In IEEE Infocom 2016—The 35th Annual IEEE International Conference on Computer Communications. IEEE, 1-9. 2016.

Chao Zhang. Symmetric and Asymmetric Aggregate Function in Massively Parallel Computing (extended version). Ph.D. Dissertation. LIMOS (UMR CNRS 6158), Université Clermont Auvergne, France. 2017.

Jiang et al. Catch Tartan: Representing and Summarizing Dynamic Multicontextual Behaviors. In Proceedings of the 22nd ACM SIGKDD International Conference on Knowledge Discovery and Data Mining. 945-954. 2016.

Liu et al. Isolation forest. In 2008 Eighth IEEE International Conference on Data Mining. IEEE, 413-422. 2008.

Manousis et al. Enabling Efficient and General Subpopulation Analytics in Multidimensional Data Streams. In VLDB 2022. PVLDB, 2022.

Overview of ClickHouse Architecture. ClickHouse Docs. https://web.archive.org/web/20230519094251/https://clickhouse.com/docs/en/development/architecture. May 19, 2023.

Panos Vassiliadis. Modeling Multidimensional Databases, Cubes and Cube Operations. In Proceedings. Tenth International Conference on Scientific and Statistical Database Management (Cat. No. 98TB100243). IEEE, 53-62. 1998.

Ren et al. Time-Series Anomaly Detection Service at Microsoft. In Proceedings of the 25th ACM SIGKDD International Conference on Knowledge Discovery & Data Mining. 3009-3017. 2019.

Shrivastava et al. Medians and Beyond: New Aggregation Techniques for Sensor Networks. In Proceedings of the 2nd International Conference on Embedded Networked Sensor Systems. 239-249. 2004.

Yang et al. Druid A Real-time Analytical Data Store. In Proceedings of the 2014 ACM SIGMOD international conference on Management of data. 157-168. 2014.

Yu et al. Distributed Aggregation for Data-Parallel Computing: Interfaces and Implementations. In Proceedings of the ACM SIGOPS 22nd symposium on Operating systems principles. 247-260. 2009.

Jesus et al. A Survey of Distributed Data Aggregation Algorithms. pp. 1-45. arXiv:1110.0725v1 [cs.DC]. Oct. 4, 2011.

* cited by examiner

| Session ID | Session Attribute Values | Per-Session-Level Metrics |
|---|---|---|
| ... | ... | ... |
| 2341 | Akamai, iPhone | Per-session QoE metric values |
| 7654 | Level3, iPhone | Per-session QoE metric values |
| ... | ... | ... |
| 3678 | Akamai, iPhone | Per-session QoE metric values |
| 1034 | Akamai, Desktop | Per-session QoE metric values |
| ... | ... | ... |
| 5251 | Level3, Desktop | Per-session QoE metric values |
| 1634 | Level3, Desktop | Per-session QoE metric values |
| ... | ... | ... |
| 4267 | Level3, iPhone | Per-session QoE metric values |
| ... | ... | ... |

FIG. 3

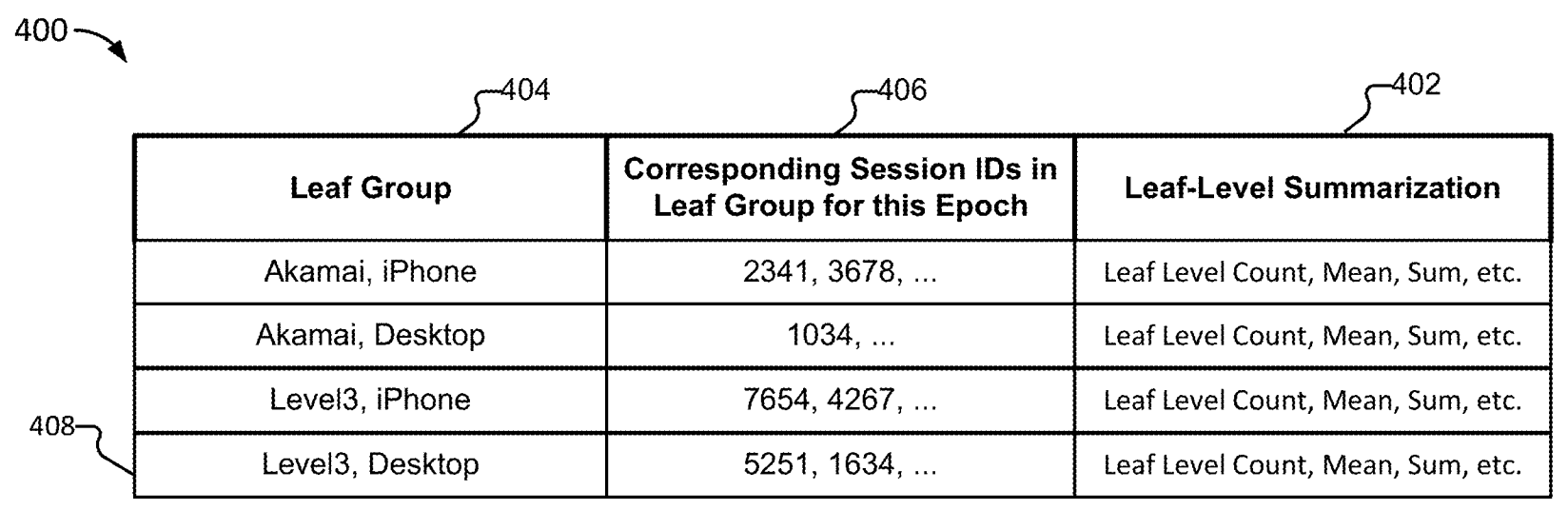

| Leaf Group | Corresponding Session IDs in Leaf Group for this Epoch | Leaf-Level Summarization |
|---|---|---|
| Akamai, iPhone | 2341, 3678, ... | Leaf Level Count, Mean, Sum, etc. |
| Akamai, Desktop | 1034, ... | Leaf Level Count, Mean, Sum, etc. |
| Level3, iPhone | 7654, 4267, ... | Leaf Level Count, Mean, Sum, etc. |
| Level3, Desktop | 5251, 1634, ... | Leaf Level Count, Mean, Sum, etc. |

FIG. 4

“MULTI-COHORT REPLAY STORAGE AND RETROSPECTIVE ANOMALY DETECTION ANALYSIS”

CROSS REFERENCE TO OTHER APPLICATIONS

This application claims priority to U.S. Provisional Patent Application No. 63/538,768 entitled MULTI-COHORT REPLAY STORAGE AND RETROSPECTIVE ANOMALY DETECTION ANALYSIS filed Sep. 15, 2023 which is incorporated herein by reference for all purposes; and claims priority to U.S. Provisional Patent Application No. 63/650,309 entitled SCALABLE ALTERNATIVE HISTORY ANALYSIS FOR OPERATIONAL TIMESERIES APPLICATIONS filed May 21, 2024 which is incorporated herein by reference for all purposes.

BACKGROUND OF THE INVENTION

Some systems collect high-dimensional data over time. Running analysis on such high-dimensional data that is collected over time can pose challenges with respect to computational costs, accuracy, etc.

BRIEF DESCRIPTION OF THE DRAWINGS

Various embodiments of the invention are disclosed in the following detailed description and the accompanying drawings.

FIG. 3 illustrates an embodiment of a session-level data store.

FIG. 4 illustrates an embodiment of a leaf-level data store.

DETAILED DESCRIPTION

Figure 1:
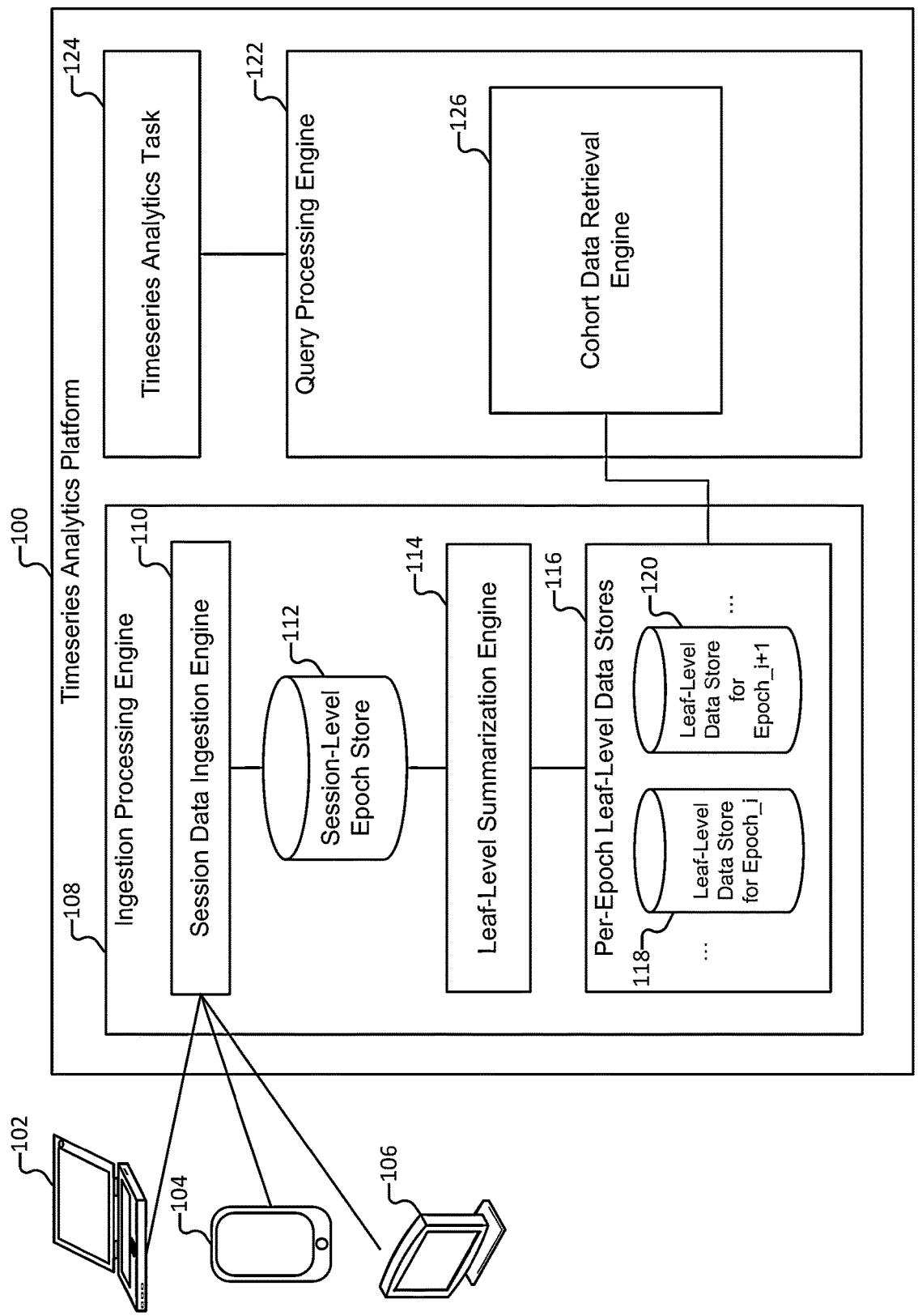
FIG. 1 illustrates an embodiment of an environment in which multi-dimensional timeseries data retention and retrieval is performed.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Many operational systems collect high-dimensional data about users/systems on key performance indices over time. On this collected data, analysts run diverse algorithms. One example of such a workflow is to facilitate data scientists to perform retrospective analysis to analyze past predictions, experiment with different model configurations and algorithms, etc. However, existing data processing solutions either pose high operational costs or do not guarantee accurate replay.

Described herein are embodiments of a framework for data summarization, storage, and retrieval that addresses both challenges to provide cost efficiency and fidelity for high-dimensional data. As will be described and exemplified in further detail below, embodiments of the data storage and retrieval techniques described herein take into account decomposability of underlying data, group sparsity, and efficiency of aggregation operations in databases. As will also be described in further detail below, embodiments of the data storage and retrieval techniques described herein provide performance improvements over existing data processing solutions, including providing superior accuracy and lower computational/storage costs.

As described above, many operational systems collect high-dimensional data about key user and system level performance indices over time. Analysts may run diverse algorithms on this collected data, such as anomaly detection over subgroups of users grouped by their attributes.

For example, in the context of video streaming, anomaly detection and analysis is used to monitor the quality of experience (QoE) for different users. For instance, a large video monitoring system may collect QoE metrics (e.g., bitrate, buffering) for each video session to find anomalous patterns affecting different subgroups of users. These patterns might include performance degradation affecting specific subgroups (e.g., are users from a specific Internet Service Provider (ISP)-city combination showing degraded performance).

Such anomaly detection in the context of video streaming monitoring may include analyzing streams of timeseries data (e.g., sensor measurements that are taken by content players during video sessions and reported by client devices to a video monitoring platform) and detecting anomalies in such timeseries data. When anomalies such as poor quality are detected by anomaly detection algorithms, alerts can be reported so that remedial actions can be taken to address any detected issues.

There are various requirements that arise when productionizing and operationalizing such anomaly detection and alerting systems. Oftentimes, after such systems are deployed, developers or users of the systems wish to perform what is referred to herein as retrospective, or alternative history analysis. For example, while timeseries analytics use cases can involve real-time detection of anomalies and forecasting, systems for such timeseries analytics may be constantly in a state of flux due to workload changes, algorithm developments, customer requests, etc. Consequently, there are a number of use cases and scenarios, such as retrospective analysis, for which access to high fidelity longitudinal data is needed. Examples of such use cases include:

- Requests for what-if analysis or explanations on alert thresholds: In some embodiments, operational timeseries analysis provides configuration knobs for users and analysts. For example, suppose a content publisher that leverages an anomaly detection system to receive alerts. The anomaly detection algorithms may be based on proprietary logic. The anomaly detection algorithms may be configurable, such as with configurable thresholds. For example, an anomaly detection algorithm can be configured to send an alert when more than a threshold number of sessions or viewers (e.g., 50 sessions) is detected to have an issue with buffering in a particular geographic area. Suppose that the publisher has been receiving alerts, but would now like to determine how the alerting behavior would have changed had a threshold been configured differently. For example, the publisher would like to determine how many alerts they would have received, how many alerts would have been missed, how long an anomaly should persist, how many users are affected before an alert was fired, etc. The techniques described herein facilitate data-driven guidance to understand why an alert was fired, or how changing thresholds would impact the false alert/negative rate based on historical data.
- Data-centric regression test in CI/CD for MLOps: Given the constant flux in workloads and model drifts, ML engineers and algorithm developers may wish to refine algorithms and configurations, such as performing hyperparameter tuning as workloads or baselines change. When they do so, they may implement DevOps best practices such as regression tests. The techniques described facilitate performing such regression testing based on longitudinal data to avoid blind spots and omissions.
- Algorithm exploration and (re) selection: As new timeseries techniques emerge, ML teams may wish to continuously test out new approaches. As there may not be a one size fits all approach, ML teams may need to rigorously test new approaches in their specific settings before deploying them. For example, the publisher may even wish to determine, retrospectively, how many alerts would have been reported had a completely different anomaly detection algorithm been utilized. Similarly, a development team may wish to test out different types of machine learning (ML) algorithms. For example, there may be a large number of ML models available. While proprietary algorithms may be used, the developer may wish to experiment with new foundation model algorithms or timeseries detection algorithms as they become available. In order to continue to improve and customize the anomaly detection and reporting experience for the customer, the developer may wish to try out such new algorithms to determine whether they provide a comparable or improved performance to existing algorithms that are in use.

In order to perform such retrospective or "what if" analysis (e.g., with respect to alerting outcomes, what if an algorithm were changed, what if a threshold were changed, what if a hyperparameter of a machine learning algorithm were changed, etc.), it would be beneficial to have the ability to access complete, historical data.

The above examples of retrospective analysis are included in a class of applications referred to herein as alternative history applications on operational timeseries measurements. In the example context of video streaming, the timeseries measurements that are collected include high-dimensional video/user session timeseries data. In some embodiments, the analysis on such high-dimensional timeseries data includes performing various cohort-level analysis as well.

While embodiments of techniques for facilitating retrospective analysis on operational timeseries measurements in the context of video streaming are described herein for illustrative purposes, the techniques described herein may be variously adapted to accommodate timeseries analytics workflows in other operational settings and contexts/domains as well, such as in mobile apps, cybersecurity, Fin-Tech, telecommunications, sensor operations, media and entertainment, etc. that may involve operational timeseries data associated with high-dimensional attributes of events, devices, users, etc., with measurements of various different key performance indicators (KPIs) of interest.

As described above, retrospective analysis includes performing different analytics (e.g., modified versions of existing analytics, using different algorithms altogether, etc.) on historical timeseries data.

One challenge for performing retrospective analysis is in making such historical data available. For example, not only can the amount of timeseries data that is collected be massive in scale, incurring a high storage cost if all raw data were retained, but there may also be other challenges to retaining historical data, such as compliance constraints or other data retention constraints. For example, there may be privacy and compliance issues with retaining raw data (e.g., in order to maintain compliance with regulations such as General Data Protection Regulation (GDPR)).

Suppose that a developer would like to determine how many alerts would have been reported in the last 6 months if a threshold in the detection algorithm had been changed from 10 to 20. If the historical raw data is not retained, then such retrospective analysis may not be able to be performed.

While one alternative is to store all of the collected timeseries raw data indefinitely, this could involve an exceedingly high storage cost, given the potentially large volume of historical data to be retained. Thus, one example tradeoff when performing retrospective analysis is to either retain raw data (at high cost) to answer a retrospective analysis question, or to not retain the data for future use, in which case the data is lost, and retrospective analysis is unable to be performed.

The following are embodiments of efficient compression and retention of operational timeseries data, as well as efficient retrieval of operational timeseries data. Embodiments of the techniques for efficient retention and retrieval of operational timeseries data support various types of analytic tasks, such as real-time timeseries analytics tasks, as well as the retrospective analyses described above. In retrospective analysis, queries, which may be unforeseen queries of interest, are to be applied on retained data as if the complete historical raw data were available.

Using embodiments of the techniques described herein, operational timeseries data is compressed in an efficient representation that supports future queries, the parameters of which are not necessarily knowable at the time that the timeseries data is retained. For example, if it were known ahead of time what type of queries would be run, then the timeseries data could be pre-emptively stored or cached in a particular manner to support the pre-determined types of queries. However, performing such data retention that is specific to a particular type of query would limit the types of retrospective analyses that could be performed, and the alternative histories that could be explored, at later times (for example, if a query were requested for data that had not been chosen to be retained).

For example, future queries may be unforeseen in many directions, where it is unknown what cohort may be of interest, what thresholds of a timeseries analysis algorithm will be changed, which class of algorithms will be applied to the retained data, etc. As one example, in the context of video streaming, video sessions may be characterized by a large number of dimensions/attributes, each of which may take on one of a large number of possible values. When performing anomaly detection in QoE applications, it would be beneficial to be able to identify anomalies in specific cohorts. A future developer may wish to perform retrospective analysis in which they change a threshold value from five to ten and determine how many alerts would be reported in a certain geographic region. However, it would be difficult to determine what groups of video sessions with what combinations of attributes (e.g., which specify cohorts) to retain ahead of time. Determining what telemetry data/metrics for what groups/cohorts to retain, and how, is a challenge that affects the ability to perform operational analytics.

With existing techniques, unless all historical timeseries data were retained, such retrospective analysis questions could not be answered, or could only be answered in a limited manner. For example, recent historical timeseries data can be retained (e.g., last week of data), but such short-term data retention would not support, for example, longitudinal analysis, such as continuous regression testing (e.g., in continuous integration/continuous deployment (CI/CD)) of various approaches on historical datasets to benchmark performance. In the case of anomaly detection, a customer may seek to know if alerts triggered by the system several weeks ago could have been suppressed by using different sensitivity thresholds. If data for only a small window of time were retained, then this would limit what insights could be gained from retrospective analysis.

As another example, in machine learning (ML), it would be beneficial to perform regression tests over longitudinal test cases. For example, ML scientists may seek to explore different hyperparameter settings for prediction models or evaluate new approaches as new timeseries detection algorithms emerge. In the context of anomaly detection, suppose that a pattern was observed six months ago, it would be beneficial to determine that a new or changed detection algorithm would not miss this pattern. Without retaining or storing sufficient statistics of the raw timeseries data from six months ago, such queries would not be able to be performed.

The techniques described herein support such timeseries analysis tasks while simultaneously providing low total cost of ownership, as well as accurate replay for subsequent unforeseen tasks in the future. Using the techniques described herein, long-term operational timeseries data is compressed in a manner that is not only efficient from a data storage perspective, but also provides high fidelity for a broad spectrum or class of timeseries analysis algorithms that are to be performed at some future stage. For example, using the techniques described herein, sufficient statistics of timeseries data are retained in an efficient manner that also facilitates answering of subsequent queries with high fidelity. In this way, future queries, such as for retrospective analysis, can be answered with high fidelity, without having to have retained all raw timeseries data over all time for all possible groups with all possible combinations of attributes (which while feasible, would be highly expensive).

With respect to existing solutions, consider storing and retaining all of the raw measurements (e.g., attributes, metrics) per timestep in a database and computing the combinations/statistics of interest when a query is issued. Such an approach faces data retention challenges (e.g., there may be terabytes of raw user session data per day). Other example approaches are to precompute only a select subset of attribute-combinations (e.g., a few combinations that have been pre-selected or pre-determined to be retained) and statistics of interest, or to only store the data of interest (e.g., that triggered current alerts). However, such approaches lack coverage over future queries. For example, in the context of anomaly detection, the future algorithms or configurations that users may want to try may fall outside the scope of the subset of data that has been chosen to be retained. For example, it may be the case that with a different anomaly detection algorithm, alerts would have been triggered for some other subset of data that had not been retained.

As described above, operational settings entail significant scale, cost, unpredictability of downstream tasks (e.g., the types of data that will need to be available are not known beforehand or a priori), and a combinatorically large number of subgroups of interest (due to the high-dimensionality of the data). This is in contrast to conventional timeseries problems with a single or very small number of timeseries to store and analyze. Existing data processing solutions fall short when handling such high-dimensional timeseries data, and face a tradeoff between computational/storage costs and accuracy.

Embodiments of the data retention and retrieval system described herein support and provide at least the two following properties: predictive equivalence with low total cost of ownership. Using the techniques described herein, the tradeoff between cost of ownership and accuracy is eliminated. For a class of timeseries analysis tasks, the data retention and retrieval techniques described provide lower cost as compared to existing solutions (e.g., with respect to storing output/raw data), while also providing perfect accuracy, in contrast to approximation solutions (e.g., sampling, sketching, etc.) that have high variance in accuracy across groups. As used herein, predictive equivalence refers to fidelity. For example, a future query can be asked of the system that is not known beforehand (e.g., during a previous ingestion and summarization stage, further details and embodiments of which will be described below). The historical timeseries data has been stored or compressed or represented in a manner such that, when provided as input data to the query (e.g., analytics task being performed), the resulting answer is the same as if the original raw data had been used to answer the query. For example, suppose the system is asked to determine, if a threshold had been changed from 10 to 20, how many more alerts would have been reported for San Francisco over the last 20 months. Embodiments of the system described herein can answer that question using a compressed or compact data structure, where the resulting answer is the same answer that would have been arrived at if all of the raw data had been retained and not been deleted.

The system described herein facilitates both retaining of timeseries data (in a compressed or compact data structure), as well as retrieval of relevant timeseries data when performing a task (e.g., to answer a query). While there is a storage cost to retaining the compressed data, as well as a compute cost in any pre-processing, post-processing, or query answering, when considering the total cost of ownership of the system (including the cost of ingesting data, the cost of storing data, and the cost of processing future queries), the system described provides a low total cost of ownership compared to existing data processing solutions.

As described above, some existing systems for alternative history analytics retain the raw data in its entirety, which results not only in a high storage cost, but also a high compute cost on query, as the raw data is repeatedly queried. Other existing systems could perform pre-processing when providing an answer, however, there is a high cost to performing such pre-computation. In other cases, such alternative history analytics are simply not supported by existing systems.

Embodiments of the analytics system described herein provide a middle ground for supporting such alternative history or retrospective analytics that is both low cost and high fidelity. Further embodiments and details of such a low-cost retrospective querying system for operational timeseries databases are described below. While having low total cost of ownership, the system described herein provides predictive equivalence, or sufficient or complete fidelity, for a broad class of algorithms that are utilized in performing timeseries analysis. For example, the techniques described herein provide a computationally efficient (from both a storage and compute perspective) framework for supporting population or cohort-level timeseries analytics with high fidelity.

Embodiments of the data retention and retrieval techniques described herein provide a workflow that takes into account, without limitation, the following:

many timeseries analysis tasks (such as anomaly detection tasks) exhibit a decomposability property, where the statistics or metrics for a "parent" user group can be derived from the statistics or metrics of "children" groups that constitute the parent group. For example, the features (e.g., statistics or metrics) of a group can be derived from the child groups' features.

In any given timestep or epoch, the number of active subgroups that appear is sparse, and the number of active sessions can often fit into a single compute node in memory.

When the active sessions for a given timestep can fit inside the resident memory of a single machine, using operations such as CUBE in analytical databases can dramatically outperform other operations (such as GROUPBY operations) per subgroup.

Embodiments of the data retention and retrieval techniques described herein provide a workflow in which, at data ingest time, useful statistics of the metrics for "leaf" groups are tracked. Then, at task issue time (e.g., when a timeseries analysis task is to be performed), data retrieval (to provide as input to the timeseries analysis task) includes recomputing or reconstructing or deriving the desired metrics of interest for the group of interest. In some embodiments, the statistics involved in analysis tasks for all of the other groups can then be derived from this summary of leaf groups that had been retained. For example, at task issue time, retrieving the statistics corresponding to a parent group of interest includes performing a computation or derivation of the statistics of interest from retained summarizations for child leaf groups that are present for the time step of interest that constitute or make up the parent group of interest.

As will be described in further detail below, embodiments of the multi-dimensional, timeseries data processing workflow include two components. First, an ingest time component/stage in which ingestion includes ingesting raw session data over time, and computing and retaining leaf group features from the collected raw session data. The workflow also includes a retrieval component/stage (e.g., performed at query time), in which a wide range of features for any possible group is efficiently retrieved, based on derivation from the leaf group summarizations that had been determined and retained during the previous ingest stage/time.

In various embodiments, such a decoupled workflow allows for delaying of the binding between the compute-at-ingest, and the compute-at-query time to simultaneously satisfy both low total cost of ownership, as well as accurate replay for unforeseen tasks (which in existing data processing systems are contradicting and involve tradeoffs).

As described above, the multi-dimensional timeseries data retention and retrieval techniques described herein support the capability of providing efficient timeseries analytics, including facilitating efficient answering of multi-dimensional timeseries queries for various cohorts. As described above, examples of retrospective analysis use cases that are facilitated using the techniques described herein include exploration of new timeseries algorithms (e.g., because new open-source packages for timeseries detection have been released), benchmarking of algorithms, internal research and development use cases, longitudinal data-centric regression testing (such as CI/CD for machine learning), etc.

As described above, existing systems either are unable to handle answering such queries, or have a high resource cost, such as with storing large amounts of raw data. For example, existing solutions involve using big data systems or databases such as Spark. However, such solutions can be expensive, from both a storage footprint and compute perspective. In comparison, the techniques described herein provide improvements in terms of both performance (e.g., 100 to 200× performance improvement), as well as lower total cost of ownership. As will be shown in further detail below, the multi-dimensional, timeseries data retention and retrieval techniques described herein support efficient and accurate timeseries analysis, both for real-time analysis tasks, as well as retrospective analysis tasks. For a broad spectrum of downstream analysis tasks (that utilize embodiments of the retrieval techniques described herein for input), the retention and retrieval described herein establish perfect accuracy. As compared to existing data processing solutions, the techniques described herein provide a significantly lower cost of ownership, without any loss in accuracy.

In various embodiments, timeseries analytics workflows that embodiments of the techniques described herein can support include those that appear in operational settings, such as large-scale monitoring and analytics in settings such as telecommunications, sensor operations, media and entertainment, mobile applications, etc. Operational settings can involve high dimensional data, where operators (e.g., developers or users of timeseries analytics workflows) may be interested in spatiotemporal insights across multiple user/endpoint subgroups to drive operations. For example, multi-group timeseries analytics can involve a multivariate view across multiple groups or subpopulations of users/sessions as defined by user/session attributes.

FIG. 1 illustrates an embodiment of an environment in which multi-dimensional timeseries data retention and retrieval is performed. In the following, for illustrative purposes, an example in the context of large-scale video analytics is described.

Video analytics services perform Quality of Experience (QoE) analysis on user session data facilitating content and Internet providers to improve user experience, viewership retention, and satisfaction. For example, analytics are performed on a large volume of video streams in which numerous user/session events are recorded over time across many customers. Further, various video analytics metrics are collected from video sessions including large numbers of different users with different characteristics. Examples of these metrics (also referred to herein as telemetry data) include, without limitation, buffering times, bitrate, number of frames dropped, etc. In some embodiments, each user's viewing session is also annotated with additional metadata (e.g., attributes). In some embodiments, the session attributes include dimensions along which a viewing session can be characterized, where each attribute/dimension can be one of multiple values.

In the following examples, session data of QoE measurements is ingested, with an anomaly detection and alerting algorithm (example of a timeseries analytics task) run on top of such QoE measurements. The anomaly detection algorithm is configured to report alerts when anomalous behavior in the streams of QoE session data is detected.

For example, analysis and real-time detection workflows may involve identifying patterns of interest or anomalies in metrics over groups of users categorized by their similarities in a subset of their attributes (where examples of attributes include geolocation, Internet Service Provider (ISP), device used, etc.). For example, when buffering times of users from a specific state using a specific ISP is unusually high, the ISP can be notified to rectify any network issues. In some embodiments, detecting QoE issues and patterns entails detecting anomalies in generated metrics for each user group determined by the common set of attribute assignments among the users in the group.

Datasets may contain a large number of possible user groups (e.g., millions) based on number and possible combinations of user attributes. Such groups may be monitored for patterns in multiple metrics. Similar user analytics are encountered in other domains such as network analysis, monitoring logs, etc., where user data from multiple types of users are collected and analyzed. While examples in the context of video monitoring are described herein for illustrative purposes, such types of multidimensional telemetry and use cases appear in various other domains, such as telecommunications, observability, IoT (Internet of Things), etc.

In the following example, suppose that an issue was detected with the alerting of the current anomaly detection algorithm. For example, suppose an alert misfired for an event during the last week or the last month, or that an incident was missed in which an alert should have fired, but did not (e.g., false positive in which an alert was reported or fired for an anomaly that did not actually occur in real life). Suppose that a customer utilizing the output of the anomaly detection, or a data scientist who developed the anomaly detection algorithm would like to investigate why an alert was missed. For example, suppose a data scientist who, in addition to learning why an alert was missed, would also like to determine whether changes to the algorithm should be made (e.g., to test whether a configurable threshold should be changed, or a different algorithm should be used) to catch the missed alert or to reduce false positives. The above are examples of questions that customer service or publishers or data scientists may ask, other examples of which include "why did the anomaly detection algorithm not fire?", or "why did the algorithm fire an alert", or "should I change a threshold because too many alerts were being reported?"

Suppose that a developer would like to perform a "what if" or retrospective or alternative history analysis by observing what the alerting behavior would have been (over a controlled period of time in the past) had the configuration of the anomaly detection been different (e.g., tuned differently). For example, if previously, a threshold of five had been used and one alert had been received per day over the last six months, the techniques described herein can be used to determine what the pattern of alert behavior would have been over the same period of the last six months had a threshold been changed to another value, say three. For example, it may be the case that one hundred alerts would have been reported per day. As will be described in further detail below, utilizing embodiments of the processing performed by platform 100 (further details of which are described below), the developer will be able to efficiently perform retrospective analysis to update the configurable threshold to a desired level based on the analysis over historical data. In this way, for operational anomaly detection that is in production, such thresholds (which can also be considered as hyperparameters for tuning such operational algorithms in production) can be continuously tuned or trained.

In the example of FIG. 1, platform 100 is a data storage and retrieval platform for supporting timeseries analysis. As will be described in further detail below, at ingestion time, platform 100 is configured to store compressed summaries of multidimensional telemetry data over time. For example, multi-dimensional, multi-group user data is ingested and summarized. The summarized data is then stored to facilitate a wide range of timeseries analysis (e.g., retrospective analysis in the future).

At query time (e.g., in response to a query or a regression test on past data with modified algorithms/parameters), platform 100 is configured to retrieve involved statistics from the compressed summaries. In some embodiments, this includes extracting, from the summarized data, relevant features/information that are involved in a timeseries analysis task of interest, which can specify a specific group of interest.

The following are embodiments of processing performed during an ingestion and summarization stage. In the example of FIG. 1, suppose that video streaming session data including QoE measurements or metrics is received from client devices with content players used to stream content, such as client devices 102, 104, and 106. Examples of such client devices include laptops, smartphones, tablets, set-top boxes, televisions, game consoles, etc. In some embodiments, the client devices include sensors (e.g., implemented using software development kits (SDKs)) that take QoE measurements over time with respect to sessions during which content (e.g., audiovisual content) is streamed by a content player resident on the client device. For example, over the course of a video session, the sensor collects telemetry data including QoE measurements and events, such as bitrate, buffering events, network connection state (e.g., WiFi or on cellular), etc. In some embodiments, the QoE measurements and events are reported on-demand or periodically in messages that are also referred to herein as heartbeat messages.

In this example, the streams of QoE data for each session are transmitted from the clients over a network, such as the Internet, to ingestion processing engine 108 of timeseries analytics platform 100. For example, raw data is collected for individual QoE sessions over time.

In this example, the raw user/session data (e.g., telemetry data) of each individual session is ingested by session data ingestion engine 110. The combinations of attribute values with which each of the sessions (e.g., geographic region, device operating system, content delivery network (CDN), ISP, etc.) are annotated are also recorded for each session. In some embodiments, session data is reported using a real-time streamlining system or messaging layer, such as Kafka.

In this example, the incoming session data for a given timestep (also referred to herein as a temporal epoch) is stored to session-level epoch data store 112. For example, the timestep is a period or window of time (e.g., one minute, one second, or any other temporal granularity, as appropriate). The session data that belongs to the window of time (e.g., according to timestamps associated with session data) is maintained in the session-level epoch store 112. As will be described in further detail below, leaf level summarizations for the epoch are generated from the individual sessions that are resident in the session-level epoch store. In some embodiments, session-level epoch store 112 is a temporary store, where after a time-step, the store is flushed, and the next minute's worth of session data is stored to the session-level epoch store 112.

In the following examples, while individual session/user data is collected, the retrospective (or real-time) timeseries analytics that could be performed at a later, subsequent time include processing to be performed at a population-level. For example, population-level behaviors can be analyzed, such as the behavior in certain geographic regions (e.g., in San Francisco), as well as certain cohorts/populations sharing a certain combination of dimensional attributes (e.g., the behavior of a population that belongs in a certain geographic region, using devices with a certain type of operating system, while being connected to a certain Internet Service Provider (ISP)).

The following are further details regarding user groups and attributes. Consider the dataset of telemetry data that is received over time (e.g., from content players), aspects of which are also described below. As one example, let the dataset at time t be denoted as $\mathcal{D}_t$. The dataset includes telemetry data from multiple users/sessions (which can be on the order of millions or tens of millions) at every time-step (e.g., each minute or second or any temporal granularity as appropriate). Each user/session is annotated with a set of attributes which describes the user-related features. For example, each user is annotated with M attributes which describe the user-related features.

As described above, in the case of video analytics, examples of such attributes include user location, ISP, device information, etc. That is, each user session (which includes telemetry data) is characterized with a set of attributes. As one example, formally, each user/session j in the dataset is characterized with M attributes which are initialized as $\text{Attr}_j = \{\text{Attr}_j[i]\}_{i=1}^{M} \in \mathcal{A}_1 \times \mathcal{A}_2 \times \ldots \times \mathcal{A}_M$ where $\mathcal{A}_i$ is the space of all possible values for attribute i. In some embodiments, a reasonable assumption is made that each attribute can only take discrete values. Further, K metrics are recorded from each user. The metrics for user j are denoted as $m_j = \{m_j[i]\}_{i=1}^{K}$. Therefore, in this example, the dataset at time t is $\mathcal{D}_t = \{(\text{Attr}_j, m_j)\}_{j=1}^{N_t}$ where $N_t$ is the total number of users/sessions tracked at time t.

In some embodiments, each user group or cohort is characterized by the set of attributes common to all users in the group. As one example, formally, a group C(a) is characterized by attribute initialization a $\in \mathcal{A}_1 \cup \{*\} \times \mathcal{A}_2 \cup \{*\} \times \ldots \times \mathcal{A}_M \cup \{*\}$, e.g., a is a sequence of attribute values or * where initializing an attribute as * denotes that the group users can take any values for the respective attribute. In this example, we also denote $C_t$ to be the set of non-empty (contains at least one user) groups derived from dataset $\mathcal{D}_t$.

Note that the number of possible user groups that can be tracked is exponential in number of attributes: the number of possible user/session groups is the product of the number of possible subset of attributes times the number of possible values each of the attributes can take $(\Pi_{i=1}^{M}(|\mathcal{A}_i|+1)-1)$. As will be described in further detail below, in various embodiments characteristics or aspects of the dataset and analytics conditions or objectives are taken into account for the system described herein to be cost efficient both in terms of storage and compute.

In operational timeseries settings, there can be a hierarchical subset relationship across user groups of interests. For example, a user group corresponding to users/sessions in the United States is composed of all user groups, each of which includes users from each of the states in the United States (US). Moreover, the statistics F involved in most analytics algorithms can be derived from statistics of children subgroups. As described above, in the context of video analytics, telemetry data for an individual user/session includes QoE metrics such as buffering times, bitrate, number of frames dropped, etc. An example of a statistic of a metric for a group is a mean of the bitrate across users/sessions belonging to the group. The mean of a metric for a group of users can also be derived from the mean of the metric for each of the children subgroups. This property is referred to as decomposability, in which features of a group can be derived from the child groups' features.

Thus, in many cases, statistics F (of metrics) for the timeseries analytics tasks to be performed (and in anticipation of which embodiments of the summarization and retention described herein is to be performed) can be generated for "parent" groups of users from statistics collected for each of its children subgroups. In the example of the United States, the statistics for the "parent" group of US sessions can be generated from statistics collected for groups of each state of the US. For example, a count (statistic) of a metric (number of attempts) for a parent group (US sessions) can be determined as an aggregation of the counts of the metric for each of the constituent child groups (e.g., sum of the counts of each of the individual states). Embodiments of the techniques described herein utilize such decomposability to avoid storage-heavy solutions that need to store data for all possible subgroups.

Such task decomposability is used to guide the statistics that are stored by the platform for user groups, as well as for which groups statistics are stored for. While timeseries analysis algorithms such as anomaly detection algorithms and other analytics tasks can involve a wide range of statistics across user subgroups, decomposability facilitates compression of these demanded statistics into a smaller list of statistics for some groups. Statistics for parent groups are then generated (at retrieval time) by operations on stored statistics from children subgroups.

As one example, formally, given the session dataset $\mathcal{D}_t$, the final set of inputs to a timeseries analytics algorithm (during a subsequent query time) is a set of features for all possible subgroups $C_t$. In some embodiments, the size of $C_t$ is upper bounded O $(\Pi_{i=1}^{M} |\mathcal{A}_i|)$ which is exponential in number of attributes M. However, in some embodiments, the desired statistics F' can be generated for the smallest possible set of subgroups that cover all possible subgroups called LEAF. In some embodiments, these are subgroups where all attributes are initialized to a specific value, (e.g., Leaf($\mathcal{D}$)={C(a): a∈$\mathcal{A}_1$×$\mathcal{A}_2$×...×$\mathcal{A}_M$}). For example, in the leaf-level group, every attribute is populated with a specific value, whereas for a parent group, the value for at least one attribute is not fixed across the user sessions in the parent group (that is, across the user sessions in the parent group, the value of at least one attribute can be indicated by the wildcard *, indicating that the value of that attribute need not be fixed for user sessions belonging to the parent group, where a user session could have any value for that attribute while still belonging to the parent group based on its remaining combination of specified attribute values). Let $\mathcal{A} \subseteq Attr_1 \times Attr_2, \ldots, \times Attr_M$. In some embodiments, and as will be described in further detail below, the platform described herein operates in two stages, as described above and will be described in further detail below:

In some embodiments, at ingest time, the needed statistics F' of the leaf subgroups are summarized from the raw user/session data and stored.

In some embodiments, at retrieval time, the desired features F for any user group C(a) are derived from the intermediate features $U_{a' \in Child(a)}$ $F'(\mathcal{D}_{t,a'})$, where Child(a) is the set of leaf groups that are contained in subgroup a. For example, the features (e.g., statistics of metrics of the users/sessions that belong to the subgroup a) are derived from the summary statistics that were previously stored for the leaf groups.

The following are further embodiments regarding determining a compact representation that includes a summarization of the aforementioned leaf groups. As described above, during the ingestion stage, leaf-level summarizations for the leaf groups are computed and retained, which is more efficient than storing all raw session data or statistics for every possible group (e.g., for parent groups as well). At a later time, features for any group can be efficiently derived from the previously prepared and retained leaf-level summarizations.

In the example of FIG. 1, leaf-level summarization engine 114 is configured to use the session-level telemetry data and corresponding annotated attribute information to determine leaf-level aggregate information.

In some embodiments, attribute spaces can be considered as a large lattice, a lattice being a partial order. For example, consider two attributes, CDN and device type. In this example, suppose that each attribute has two possible attribute values. For example, suppose that the possible values for the CDN attribute are Akamai and Level3. Suppose that the possible values for the device attribute are iPhone and Desktop. The individual sessions can be grouped into various subgroups. For example, an individual session can have attribute values that belong to the combination of Akamai and iPhone, while another individual session can have attribute values that belong to the combination of Level3 and Desktop.

Figure 2:
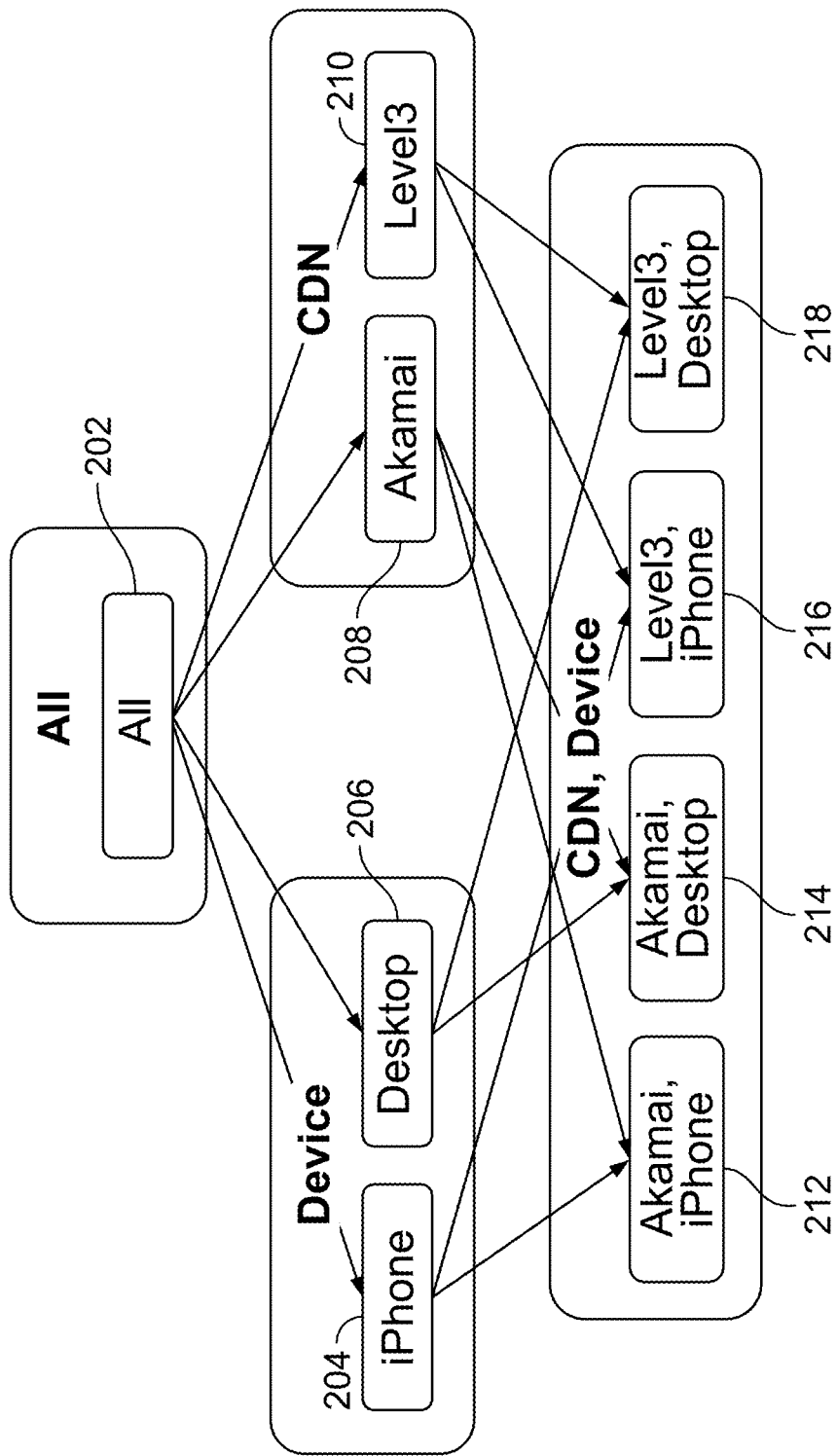
FIG. 2 illustrates an embodiment of hierarchical relationships among groups.

An example tree, graph, lattice, or hierarchical relationship representation of subgroups is illustrated in FIG. 2. In the example of FIG. 2, each node in the tree refers to a group, sub-population, or cohort. With respect to timeseries analysis, each node in the graph could be the subject of a potential query in the future, where any sub-population or cohort is of potential interest. For example, a developer may later wish to query at the level of all session traffic (e.g., group 202), or query for device-level alerts (e.g., group 204 or group 206), or query for CDN-level alerts (e.g., group 208 or group 210), or query for combinations of CDN-device level alerts (e.g., for groups 212, 214, 216, or 218). While an example involving two attributes, each with two possible values is shown in FIG. 2 for illustrative purposes, sessions may be characterized by various other attributes, each with various possible attribute values.

As described above, for many downstream timeseries analytics tasks, the involved statistics F(·) exhibit decomposable property, e.g., the statistic for a "parent" user group can be derived from a smaller number of statistics of "children" groups that constitute the parent group.

In the example graph of FIG. 2, the leaves are groups 212, 214, 216, and 218. In some embodiments, leaf-level aggregates or summarizations are determined, as information regarding other higher-level nodes (e.g., groups 204, 206, 208, 210, and 202) can be reconstructed from the leaf-level aggregate information. For example, if statistics about the leaf nodes are recorded and stored, then the intermediate nodes in the graph can be determined as statistical aggregates of their children. That is, the statistics of a parent (e.g., statistics of QoE metrics) are based on the aggregation of the statistics of those metrics of its children. For example, the average bitrate of desktops (group 206) can be determined as the average bitrate of its children (Akamai-Desktop 214, and Level3-Desktop 218). As shown in this example, summary statistics for intermediate or higher-level nodes in the graph representation of session-groupings/cohorts are composable from the statistics of the leaf nodes.

As will be shown in further detail below, such a decomposability property is utilized, where the property of a parent subpopulation or cohort is derivable from the statistics of its constituent children. The above examples of leaf-level aggregate statistics that are computed are examples of statistics that have such a decomposability property. Such statistics are also usable for timeseries analysis. Other examples of statistics usable for timeseries analysis that also have such a decomposability property include mean, count, sum, etc. In some embodiments, the types of statistics that are computed for the leaf-level are configurable.

In some embodiments, during ingestion processing, statistics are computed for the leaf-level groupings. For example, sufficient statistics for the leaf groups are computed and retained, such as average QoE metric values for all of the sessions belonging to a leaf group, number of users, number of sessions, histograms, etc.

The following are further embodiments of ingestion of individual session data and generation of leaf-level aggregate properties/summarizations.

In some embodiments, leaf-level statistics are generated from raw session data that is collected within a particular temporal period or epoch or window of time or time step. In this example, a temporal resolution or granularity of one minute is used for illustrative purposes. Other temporal resolutions or granularities or timesteps may be utilized (e.g., seconds), as appropriate.

In this example, leaf-level summarization engine 114 is configured to compute leaf-level summarizations for any leaf groups that are active during an epoch (e.g., for each minute of wall-clock time). Referring to the example of FIG. 1, the multidimensional telemetry data for individual sessions stored for the given epoch in session-level epoch store 112 are accessed. A leaf-level summarization for a given leaf group is generated by aggregating the telemetry data for the individual sessions in session-level epoch store 112 that belong to the given leaf group.

For example, the individual sessions in session-level epoch store 112 are grouped based on their annotated combination of attribute values, where individual sessions that share a combination of attribute values in common are grouped together. Each unique grouping corresponds to a leaf group. In the case of individual sessions, a specific value is specified for each attribute, indicating which particular leaf group the individual session belongs to. For each leaf group, a leaf-level summarization is generated by computing statistics (e.g., mean, sum, count, etc.) on an aggregation of the telemetry data for individual sessions belonging to a given leaf group. As one example, a GROUPBY operation is performed to implement the aggregation and generate the leaf-level summarization.

In some embodiments, the leaf-level summarizations generated for a given epoch are stored to a leaf-level data store corresponding to the epoch. For a next epoch, a next set of leaf-level summarizations is generated for the next epoch, and stored to a corresponding data store for the next epoch. Examples of such per-epoch leaf level data stores (118 and 120) are shown at 116 of FIG. 1.

In some embodiments, an active leaf group refers to a leaf group for which session data was received for the given epoch (where telemetry data was received for at least one session whose combination of attribute values matches to the attribute values of the leaf group-if so, then the leaf group is determined to be active). In some embodiments, an inactive leaf group refers to a leaf group for which no session data was received for sessions with attribute values that match to the attribute values of the inactive leaf group. At a subsequent time (e.g., during querying in the future for retrospective analysis), the leaf-level statistics for the epoch will be used to fulfill any cohort-level timeseries analysis to be performed that is associated with time periods that include the epoch. In some embodiments, the temporal granularity of the timeseries analysis corresponds to the epoch's granularity. For example, anomaly detection is performed with information provided at the granularity of a minute in this example, and the leaf-level summarizations are generated for a matching timestep granularity.

The following is another example of leaf-level statistics generation during ingestion-time processing. As described above, in some embodiments, the raw telemetry data/metrics for individual sessions belonging to an epoch is accessed. Leaf-level summarization data engine 114 is configured to process the accessed individual session data to determine aggregate summary statistics for leaf groups that are present in the individual session data in the epoch. In some embodiments, leaf-level statistics are limited to being computed and stored for only active leaves.

For example, for illustrative purposes, suppose that each individual session can be characterized or described according to a hundred different attributes, where each attribute can take one thousand values. While the space of all possible combinations of attribute values (and thus number of possible leaves) is $100^{1000}$, at runtime, and at any given point in time (e.g., for the epoch), only a relatively small, sparse number of those leaves will be active. For example, an individual session will be characterized by a specific combination of attribute values for those 100 dimensions, where that specific combination of attribute values corresponds to a leaf node in the graph of groups of sessions. During ingestion, for a given epoch, sessions belonging to only a sparse number of leaf groups will be present. For example, suppose that 100,000 sessions are received in the one-minute epoch. Only a sparse number of leaves will be active (e.g., present among the 100,000 sessions in the epoch). For that epoch, most leaves will be inactive, where there are no sessions that are ingested within the epoch that happen to have the specific combination of attribute values that match to the leaf group. That is, for any given epoch, the number of observed leaf groups is smaller than the maximum possible leaf groups. For example, a given epoch contains telemetry (e.g., metrics) data from a variable number of users/sessions, where the number of users observed for any group can vary across time, with many leaf groups potentially having very small or zero observed samples (sessions) for most time-steps.

In some embodiments, for a given epoch, the number of unique leaves that are active is upper bounded by the number of sessions in that epoch. For example, in a "worst" case scenario, every session has a unique combination of attribute values (and thus each session belongs to its own leaf group). That is, the set of leaves that appear in a one-minute epoch will depend/vary on the set of sessions that were active (and detected) for that one-minute epoch.

As one example, leaf summarization is performed or implemented using a groupby operation on the multidimensional telemetry data contained in session-level epoch store 112. As one example, ClickHouse supports such operations. Other OLAP analytics databases, such as Druid, or other timeseries databases can also be utilized to perform the leaf summarization operation. In some embodiments, a leaf-level database is generated from the session-level database (for the epoch), via the summarization operations described above. While the contents of the session-level data store for the epoch need not be retained, the leaf data store can be maintained for long-term use.

FIGS. 3 and 4 illustrate embodiments of session-level and leaf-level data stores. The leaf-level data stores are also referred to herein as replay storage (e.g., for subsequent timeseries analytics tasks that could be performed). Shown in the example of FIG. 3 is an example of a session-level data store or database, such as session-level epoch store 112. In the example of FIG. 3, each row of data store 300 corresponds to a session that was received/ingested. In this example, the raw data includes one-minute session data with per-session statistics. While a table data structure is described herein for illustrative purposes, other data structures may be utilized as appropriate. In this example, each row corresponds to an individual session, where an individual session is associated with a combination of attribute values (302) and telemetry data for that session (304). In some embodiments, a session/user identifier is also recorded (306).

Shown in the example of FIG. 4 is an example of a leaf-level data store or database, such as leaf-level data store 118 or 120. In the example of FIG. 4, each row of data store 400 corresponds to a leaf group that has appeared in the session data for the epoch. In this example, for each leaf, a summary across the sessions that appeared in that leaf group is computed and stored (402). The combination of attribute values defining an observed leaf group is stored (404). While a table data structure is described herein for illustrative purposes, other data structures may be utilized as appropriate.

As described above, referring to the example of FIG. 1, leaf-level summarization engine 114 is configured to evaluate, for a given epoch, the session data that was received during the epoch, and determine which leaves are active in that session data for the epoch. As described above, in some embodiments, a leaf group is determined to be active if there is session data received during the epoch for at least one session whose combination of attribute values matches to the combination of attribute values of the leaf group. As one example, the heartbeat messages (that include telemetry data for a session) stored in the session-level epoch store 112 are accessed. Each heartbeat message corresponds to an individual session, and is annotated or otherwise associated with a corresponding set of attribute values. If the combination of attribute values for the session have not been previously observed for this epoch, then a new active leaf group has been detected for this epoch. A new row corresponding to the leaf group is included in the leaf-level data store corresponding to this epoch. Each time a new combination of attribute values is encountered, a new active leaf group has been detected, and a corresponding new row is included in the leaf-level data store. As another example, the individual session data for the epoch is clustered together based on attribute values. Individual sessions that share the same combination of attribute values are clustered or grouped together. Sessions annotated with different combinations of attribute values are separated into different clusters. Each cluster corresponds to an active leaf group observed in a timestep. A row in the leaf-level data store for the timestep is generated for each cluster.

In some embodiments, identifiers of sessions belonging to an active leaf group are stored in that leaf group's row in the leaf-level data store (406). In this way, the telemetry data for individual sessions that was received during an epoch are mapped to a particular leaf group.

In the examples of FIGS. 3 and 4, for a given one-minute epoch (e.g., one minute time period in UTC (Coordinated Universal Time)), raw telemetry data for at least one session was received for each of leaf groups 212, 214, 216, and 218 of FIG. 2. That is, each of the leaf groups was determined to be active. Accordingly, four rows (one corresponding to each of the leaf groups) were created in the leaf level data store shown in FIG. 4.

If, on the other hand, no session data was received for one of the leaf groups, then that leaf group is inactive for that epoch, and a row would not have been created for that inactive leaf group. For example, if no session data with the combination of attribute values of (CDN=Level3 AND Device=Desktop) had been received for that one-minute epoch, then row 408 of table 400 would not be present in the leaf-level data store.

As shown above, in some embodiments, the leaf-level data store for a given epoch is built empirically, with a data-adaptive approach, in which rows are only included or added in the leaf-level data store for leaf groups whose corresponding combination of attribute values were actually observed in the session data for that epoch.

In some embodiments, instead of maintaining per-session statistics (which can be expensive from a computer storage perspective, and also have compliance issues), only leaf-level properties are stored, including statistical summaries of the leaf level properties from which any subpopulation queries can be reconstructed, as desired.

For example, suppose that there are one hundred sessions that fall in each of the four leaf groups shown in the data store of FIG. 4. Suppose that one leaf-level data point is an average bitrate across the individual sessions belonging to a leaf. In this example, rather than storing and maintaining 400 data points (bitrate for each of the 400 sessions), four data points are kept. This is an example of storage compression performed by the system. For example, in comparison to storing the raw session data, by only storing the leaf-level summarizations, which are sufficient to satisfy future population-level timeseries analytics, orders of magnitude compression can be achieved, with much lower data storage costs.

As described above, for a given epoch or timestep, the actual number of active leaf groups may be sparse. In some embodiments, based on the sparsity of active leaves in an epoch, an epoch data store such as leaf-level data store 400 is stored in memory. As one example, a leaf-level data store for an epoch (e.g., one-minute chunk of time) is stored to the memory of a single compute node including, for example, 64 GB of memory/RAM (random-access memory).

In this example, the sparsity of active subgroups in a given epoch allows the leaf-level summarizations for an epoch to reside in memory of a single node. That is, even though the number of possible subgroups can be exponential in the number of attributes M, in any given session the number of active subgroups that are observed in a given time-step can be significantly small enough to fit inside a single node memory. In some embodiments, the observed real-world sparsity allows the platform to be designed or implemented or architected as a single node system that can efficiently process data during ingest/summarization and retrieval stages without the overhead of multi-processor communication. In some embodiments, as described above, the platform only stores summarizations for LEAF groups that have been observed in the session dataset: $\mathcal{A}_t = \{a \in Attr_1 \times Attr_2, \ldots, \times Attr_M \| C(a) | > 0\}$.

As one example of implementing in-memory storing of leaf-level databases on single nodes, in the case of a ClickHouse implementation, a macro or hint or command can be provided to the database system to request that the leaf-level data store be kept in memory. As another example, some OLAP or analytics databases have the ability to shard in different manners and preserve data locality. In some embodiments, such databases are instructed to perform operations (e.g., the leaf-level summarization operations described above to generate a leaf-level data store) as an in-memory operation, and to keep data local.

Storing per-epoch leaf-level data stores in a single compute node, in memory, provides various computing performance benefits. For example, a large cluster of compute nodes is not needed. Distributed computing across a network of compute nodes (which would in turn involve various I/O (input/output) operations) need not be performed. This allows computations performed on an epoch to proceed quickly and efficiently.

As shown in the examples above, based on the decomposability of statistics of interest for timeseries analysis, determination and storage of leaf-level summaries is performed at ingestion time. During subsequent querying time, queries for other sub-populations are satisfied based on reconstruction using the previously stored leaf-level summaries.

As also shown in the examples above, leaf groups are determined on a per-epoch basis. Based on the sparsity of the number of leaf groups that are active and observed within any given epoch, leaf-level data stores are stored in memory, such as of a single compute node.

The storing of leaf-level summarizations is sufficient for supporting the class of queries involving subpopulation-level timeseries of queries of various types of statistics of interest.

As described above, in some embodiments, the leaf-level aggregate properties (also referred to herein as leaf-level summarizations) are retained. For example, the leaf-level summarizations for the epoch are a compressed representation of the session data ingested for the epoch. The compressed representation is computed and retained during the ingestion/summarization stage in preparation or anticipation for future timeseries analytics tasks such that, at a later data retrieval stage, telemetry data for any arbitrary cohort or group can be derived from the leaf-level summarizations that were previously prepared in advance. In this way, from the perspective of the timeseries analytics task, it is as if the original raw session data is available and accessible, with no loss in fidelity (even though in actuality, a much smaller, compressed representation of the ingested session data had been retained). Further, as will be described in further detail below, the reconstruction of telemetry data for any group/subgroup can be efficiently generated at retrieval time. In this way, in addition to maintaining fidelity, compute costs and storage footprint are greatly reduced.

In some embodiments, the raw telemetry data and properties of individual sessions (which may include personally identifiable user information) need not be retained long term. That is, with respect to future timeseries analyses on multidimensional telemetry data for cohort-level analysis, individual user-level data is no longer needed after the computation and storing of aggregate leaf group data. This is beneficial for protecting user privacy, and facilitates compliance with regulations such as GDPR.

The following are details regarding utilizing, at a query/data retrieval stage, embodiments of the leaf-level data store described herein that are generated at an ingestion/summarization stage. In the following example, a timeseries analysis is to be performed on historical data that involves operational timeseries, such as an algorithm that operates over a timeseries of high dimensional cohorts.

Continuing with the above example, suppose that the timeseries analysis to be performed pertains to anomaly detection and alerting. For example, suppose a developer would like to perform a retrospective analysis to determine what impact there would be if a threshold in the anomaly detection algorithm were changed. The developer would like to determine how the number of alerts per minute would change for various cohorts. The developer would also like to rerun the algorithm over a past period of data. For example, the developer would like to change an algorithm threshold from 5 to 7, and to run the updated algorithm over data from the past year to replot the timeseries of alerts that would have been triggered for various different cohorts (where the number of possible cohorts or groups is based on the product of the number of possible subsets of attributes and the number of possible values that each of the attributes can take). For example, the threshold could relate to a different threshold for determining that a metric is anomalous (e.g., threshold bitrate for being flagged as anomalous). As another example, the threshold could be an alerting threshold, such as a threshold volume or number of impacted users, where an alert is not fired off unless more than the threshold number of viewers are impacted. That is, the developer queries the system to replot the entire alert times series for the last year with the changed threshold.

In order to run the modified anomaly detection and alerting algorithm, QoE data over the last year for one or more subpopulations of interest is to be retrieved to provide as input to the modified algorithm. This includes querying a data store to retrieve summary statistics for each group or subpopulation that could be of interest, and then running the modified algorithm over such data. For example, performing the retrospective analytics includes two portions: retrieving statistical metrics for the population or cohort of interest, and running the modified algorithm on the retrieved telemetry data as input.

The following are embodiments of efficient retrieval of data pertaining to a cohort or subpopulation of interest. In some embodiments, such processing is performed during a data retrieval stage in response to a query or request for timeseries data, where the retrieved telemetry data for a group is provided as input to a timeseries analytics task. This includes accelerating the process of obtaining the statistics or data to feed as input to the algorithm to be run.

In the above example, by pre-emptively preparing historical data at the leaf level, statistics need not be stored for indefinite periods of time for every possible cohort that could be of interest. The original, individual raw session telemetry data also need not have been retained. Using the techniques described herein, statistics for any arbitrary cohort at any level or granularity can be efficiently reconstructed at query time from the previously stored leaf-level summaries. For example, the set of cohorts or metadata of interest need not be predetermined and stored ahead of time. Rather, the statistics for all possible attribute combinations can be determined or reconstructed as desired.

As one example improvement to the efficiency of computation, by being able to store leaf-level stores, in memory, on a single compute node, efficient attribute combination summarization for various cohorts can be efficiently performed. For example, a CUBE operation can be performed. CUBE operations are efficient for data in memory. For example, when the dataset can fit inside the resident memory of a single machine, using CUBE operations in traditional analytical databases can outperform workflows that involve running GROUPBY operations per subgroup in general-purpose compute engines such as Spark over distributed file systems or databases.

A typical solution to compute statistics on subgroups on demand is via GroupBy type operations (e.g., atop Spark or SQL) on a multi-node cluster. Note, however, as described above, in the platform described herein, the necessary statistics for all leaf groups can be stored in a single node. In this setting, the more efficient CUBE operator can be used. In some embodiments, the 'CUBE' operator in SQL and other data processing systems is a special type of GROUP BY capability that generates aggregates for all combinations of values in the selected columns. Modern OLAP engines such as Clickhouse have native support for CUBE operations and can compute the desired statistics (of telemetry data) for all possible groups on demand. While CUBE operations could be expensive in a distributed setting with a large number of shuffles and data movements, in a single node memory resident setting, it is efficient to derive the required statistics of all possible combinations of attribute values of all parent groups from the intermediate statistics of leaf groups.

As one example, formally, the cohort data retrieval engine 126 of the platform described herein derives desired or appropriate features F( ) for any user group $C$ (a) from the intermediate features $U_{a'\in child(a)}$ $F'(\mathcal{D}_{t,a'})$ where Child(a) is the set of leaf groups that are contained in subgroup a. In comparison to the use of groupby operations in a distributed context, the use of the CUBE operation on data resident in memory of a single compute node provides an improvement in time taken to compute the desired statistics for all possible groups.

As described above, performing a single cube operation on the data in a single compute node provides reduction in computation cost in comparison to other operations, such as performing group-bys in distributed systems. For example, consider the hierarchical graph of cohorts shown in FIG. 2. Suppose that all of the raw session data had been retained, and is stored across clusters in a distributed system. In order to generate the statistics for all of the groups (nodes) exemplified in the graph of FIG. 2 from the raw session data, nine group-by queries would need to be performed (one for each node). For example, group-by device, group-by CDN, group-by combination of device and CDN, etc. would be performed. That is, there would be nine different query combinations. Because the locality of the data is not necessarily known in a distributed setting, nine separate queries would need to be performed, where the results of one query could not necessarily be reused in satisfying another query. In addition to needing to perform multiple group-by operations, there may be a large amount of shuffling of raw data to satisfy the queries.

In contrast, by storing only leaf-level summaries from which statistics of other parent cohorts are reconstructable, leaf-level data stores can be stored in-memory on a single node, allowing the use of CUBE operations that can efficiently determine all possible attribute combination summarizations as part of a single operation. With respect to performing a CUBE operation, performing such a CUBE operation on raw session data may be infeasible or inefficient due to the large amount of data to be processed. Using the techniques described herein, in some embodiments, leaf-level summarizations are selectively computed and retained. This allows what is retained (for future timeseries analytics) to be a compressed representation of session data that can be stored in memory of a single node. Running the cube operation on a smaller number of leaves is more efficient (where the number of raw sessions can be much larger than the number of leaves), where a single-node cube operation can be performed (versus a large scale distributed cube operation), and where the intermediate step of constructing and utilizing leaf-level data stores that can be retained in memory accelerates retrieval of data to satisfy queries. For example, a cube operation of over 100,000 records in memory can be performed at high speed.

It may be the case that a leaf-level data store for an epoch does not fit all within memory of a single node, where the data may be stored outside of RAM, or possibly distributed across two or more nodes. Although unlikely in practice (due to the sparsity of active leaf groups at each timestep), performing the CUBE operation on a large number of records that are not all in memory, or performing a distributed cube operation would still result in a speed-up (and be no worse than), as compared to if performing group-bys on raw session data.

The following is an example implementation of the data summarization and retrieval system described herein (e.g., of ingestion processing engine 108 and query processing engine 122). In some embodiments, the platform implements the following workflow processing: (1) At ingest, per-metric statistics of interest for a given range of tasks are computed per LEAF. For example, session data is ingested. As part of ingestion, the session data is summarized to generate features for observed leaf groups (e.g., summarizations of statistics of session data belonging to each observed leaf group). In this way, the statistics of observed leaf groups are collected. The leaf-level summarizations are stored (e.g., in a leaf-level data store). (2) On query time, when a timeseries analytics task is to be performed (e.g., alternative history or real-time analysis is requested), a per-epoch CUBE is run over the per-LEAF statistics. For example, at retrieval time, all subgroup statistics are computed using the CUBE operation. The output of the retrieval is then provided as input to a timeseries analysis task (e.g., anomaly detection).

In some embodiments, the processing systems are used to implement aggregation operations such as GROUPBY and CUBE efficiently. In some embodiments, at ingest/summarization time, GROUPBY is used to collect sufficient statistics for the leaf groups from user session data by aggregating the metrics of individual users/sessions that belong to the leaf group.

In some embodiments, at fetch/retrieval time CUBE is used to derive the desired statistics for the features of the timeseries analysis algorithm for any user group from the intermediate features of the leaf groups. Most OLAP databases such as Clickhouse and Spark have native support for such operations. Further, in some embodiments, a system that can operate on a single node natively is used. Databases such as Spark are designed to operate on multi-node clusters and may not be optimized for single-node operations. In one example implementation, Clickhouse is used, which is a column-oriented OLAP database that is designed to operate on a single node and can efficiently perform queries on large datasets.

As exemplified above, the processing of generating and storing leaf-level summarizations (e.g., converting raw data to leaf-level data at ingestion time), as well as performing efficient querying (e.g., single-node, in-memory cube operations at query time) provides various computing benefits in performing timeseries analytics, such as reducing the time to retrieve data for arbitrary cohorts, reducing storage footprint (and associated cost), increasing the number of cohorts across which computations can be performed, accelerating the speed at which query results can be returned, etc. The aforementioned computing benefits are applicable to retrospective analysis, as well as real-time timeseries analytics.

The following is another example of performing timeseries anomaly detection utilizing embodiments of the multidimensional telemetry data compression and retrieval techniques described herein. In this example, suppose that the open-source anomaly detection algorithm Prophet is being utilized, in conjunction with a ClickHouse database. The operational model of the database includes data modeling or a data scheme of splitting by time. Suppose a query for timeseries anomaly detection for a particular cohort over a span of time (e.g., 1 year). The following is an example of retrieval of timeseries data to be fed into the timeseries anomaly detection algorithm.

The relevant epochs are identified (e.g., 1-minute intervals that collectively constitute the 1 year span of time of interest). For each epoch, the corresponding leaf-level data store is accessed. A single-node, in-memory cube operation is performed to generate, from the leaf-level summarizations, summarizations for all cohorts (e.g., statistics will be populated for all nodes in the hierarchical graph of cohorts). The one-minute epoch's worth of summarization data (summarized data for a cohort, reconstructed from leaf-level data) is fed (as part of a timeseries) into the timeseries anomaly detection algorithm per cohort (e.g., for a given cohort of interest, specified in the query). In this way, timeseries analysis is performed on a per-cohort, per-epoch basis. In this example, the retrieval of per-cohort summarizations via reconstruction from leaf-level cohort summarizations is agnostic to the downstream timeseries analysis that is being performed.

In the following, suppose that the leaf-level data store of FIG. 4 is processed. A cube operation is performed on the leaf-level store. The output of the cube operation is a cube database. In this example, the cube database will have nine rows, where each row corresponds to a node/cohort in the graph of FIG. 2, along with corresponding cohort-level summarization.

In the above example, for a given epoch, there was a session database (as shown in the example of FIG. 3) with the session-level data for 400 sessions, which was processed into a leaf-level database for the epoch with 4 rows (as shown in the example of FIG. 4). At query time, from the 4 rows, the cube operation generates a cube datastore with nine rows, upon using the cube operation on the leaf-level database.

As described above, different epochs may have different numbers of active leaf groups (which is dependent on what sessions with what specific combinations of attribute values were observed or collected for a given epoch). As such, during query time, for different epochs, there may be different numbers of rows generated in a cube database (e.g., if in one epoch, some combination of attribute values occurred that did not appear in another epoch).

The above example processing is used to provide a response to the query requesting statistics for a given cohort for a given epoch. As shown above, the cube operation on the previously stored leaf-level statistics for a given epoch is used to determine a summarization (based on reconstruction from the leaf-level summarizations) for one or more queried-for cohorts. The retrieved summarization for a cohort and epoch of interest, as reconstructed from the leaf-level data store, is then provided to a timeseries analytics algorithm for consumption (e.g., as input).

Referring to the example of FIG. 1, query processing engine 122 is configured to process queries for timeseries data to provide to a timeseries analytics task 124. In some embodiments, the query processing engine includes a query interface. The query interface receives a retrieval query for relevant data that indicates a time period of interest, and group(s)/cohort(s) of interest (e.g., all cohorts, specific subset of cohorts, specific cohort, etc.).

In some embodiments, responsive to the query, cohort data retrieval engine 126 is configured to retrieve or fetch telemetry data/statistics corresponding to the cohort/group of interest over the time period of interest. As one example, cohort data retrieval engine 126 identifies the epochs that make up the time period of interest. The leaf-level data stores (e.g., in stores 116) for the identified epochs are accessed. A cohort-summarization operation (e.g., CUBE operation) is performed on each of the leaf-level summarizations to generate, for each epoch in the indicated time period, summarizations for the indicated cohort of interest. For example, parent-level summarizations or statistics are derived from the leaf-level summarizations that were previously computed and retained during the ingestion phase. If a cohort of interest was not present in the session data for a given epoch, then the summarization data for the cohort for that given epoch will be empty. In some embodiments, the generated cohort-level statistics/summarizations are provided as input to the timeseries analytics task 124, which may include real-time and/or retrospective analytics.

Described above are embodiments of efficient leaf-level summarization of multi-dimensional raw data to support timeseries analytics over various populations and sub-populations. As shown above, the ingestion-side processing of raw session data, and storing and retaining of leaf-level data in the manner described herein reduces the amount of storage needed to sufficiently satisfy future timeseries queries without loss of fidelity, and reduces computational complexity. For example, query time processing can be implemented using efficient database operations that are performed in memory. As one example, an OLAP (Online Analytical Processing) database that is optimized for operations in memory can be used. Further, computational complexity is reduced by having computations performed in a single database (where the leaf-level data store(s) are maintained), in which case a distributed computing platform need not be utilized.

The above embodiments of data retrieval processing improve the efficiency of performing timeseries analytics, by significantly speeding up the process of retrieving the values for a specific cohort for a specific epoch. For example, the leaf-level data stores may reside in-memory on a single compute node. A CUBE operation is an efficient aggregation operation in such a scenario. The embodiments of the data retrieval processing described herein can be used to replace existing processing to retrieve data for input to timeseries analytics algorithms.

Existing approaches to handling tasks such as retrospective analysis can be broadly divided into two categories: 1) storing the raw data and computing the statistics on demand, and 2) storing the necessary statistics of all possible subgroups. To deal with such volume of data, such existing solutions may be implemented using general-purpose platforms such as Spark over distributed file systems or traditional databases.

Tasks such as alternative history analytics queries (retrospective analysis) are unpredictable over the candidate statistics and subgroups of interest. Hence, in some embodiments, the platform described herein is implemented with a late binding architecture from a systems perspective. In some embodiments, by delaying the binding of the subgroup summaries and the supported task, embodiments of the platform described herein will be more cost efficient and scalable as compared to the aforementioned existing approaches. With this example design decision, aspects of the analytics tasks and datasets are evaluated to identify useful properties such as those described above that allow embodiments of the platform described herein to effectively store and efficiently retrieve relevant data from user/session subgroups.

The increase in retrieval efficiency, while maintaining fidelity, facilitates or supports efficient retrospective analysis, longitudinal regression testing, etc. As illustrated above, the data compression and retrieval techniques described herein reduce the cost of ingesting data, storage of summarizations, and fetching accurate, high-fidelity statistics for any group, facilitating tasks such as allowing predictions to be equivalent to predictions on original raw data (but without necessarily having to have retained all of the original raw session data, or stored summaries for all possible groups). For example, the techniques described herein support predictive equivalence for real-time and retrospective analysis tasks, where the outputs of the timeseries analysis task operating on the extracted features (reconstructed from the summarized data) are the same as if the original raw session data had been retained and provided as input. The techniques described herein also provide low total cost of ownership, which includes the compute cost for ingesting, summarization, and retrieval, as well as storage footprint. In some embodiments, the size of the retained/stored summarized data is orders of magnitude less than the raw user dataset. Similarly, the total computational cost of using the ingest/summarization and retrieval techniques described herein is similar or significantly better than directly deriving features from raw data.

The following are further embodiments regarding derivable statistics. In some embodiments, let the metric data for any user at any given time be an element of set M. In some embodiments, the data for a subgroup of users is a finite subset of M. In some embodiments, a statistic is a function $f:2^M \to O$ that maps metric data of a subgroup to output domain O. For example, the mean statistic can be defined as $$\text{mean} = \frac{1}{|C|}\sum_{m \in C} m$$

which maps to a single scalar.

Example Definition 1 (Self-decomposable statistic) Let f be a statistic. In some embodiments, f is self-decomposable if for any finite set $M_0 \in 2^M$ and any finite disjoint partitioning of $M_0$ as $\{M_1, M_2, \ldots, M_N\}$ (i.e., $M_i \cap M_j = \phi$ for any $1 \le i < j \le N$ and $\cup_{i=1}^{N} M_i = M_0$), we have: $f(M_0) = f(\{f(M_1), f(M_1), \ldots, f(M_N)\})$.

One example statistic that is self-decomposable is SUM, which adds the metric of elements in a given subgroup. In some embodiments, the sum of a metric in a subgroup can be derived as the sum of the sums of the metric in each of the individual mutually disjoint partitions of the subgroup.

Example Definition 2 (Decomposable statistic) In some embodiments, f is a decomposable statistic w.r.t a set of statistics $N(f)=f_1, f_2, \ldots, f_k$ if there exists a function $A_f$ such that for any finite set $M_0 \in 2^M$ and any finite disjoint partitioning of $M_0$ as $\{M_1, M_2, \ldots, M_N\}$ there is: $f(M_0)=A_f(\{f_1(M_i)\}_{i=1}^{N}, \{f_2(M_i)\}_{i=1}^{N}, \ldots, \{f_k(M_i)\}_{i=1}^{N})$.

In some embodiments, a decomposable statistic is a statistic that can be derived as a function of some statistics of its partitions. For example, the statistic MEAN can be derived as the SUM of values in each partition as well as COUNT, e.g., cardinality of each partition. Decomposable statistics cover a wide range of statistics that allow pre-computing intermediate results from different partitions in distributed systems to reduce the amount of communication across nodes and for faster implementations of these functions in settings such as OLAP databases where directly querying from raw data is expensive. Moreover, the function $A_f$ can be a composition of simple aggregation functions such as addition, multiplication, etc. and elementary functions such as square root, logarithm, etc. which are efficiently implemented in modern databases.

In some embodiments, the desired statistics are derived for the smallest possible set of subgroups that cover all possible subgroups called leaf. In some embodiments, these are subgroups where all attributes are initialized to a specific value, (i.e., $\text{Leaf}(\mathcal{D})=\{C(a): a \in \mathcal{A}_1 \times \mathcal{A}_2 \times \ldots \times \mathcal{A}_M, |C(a)|>0\}$). In some embodiments, the leaf-level storage includes $\text{Repl}(\mathcal{D}_t)=\{(a, F'(\mathcal{D}_{t,a})): a \in \text{Leaf}(\mathcal{D}_t)\}$. Here, in this example, F' is the set of desired statistics for the features F of the algorithm: $F'=\cup_{f \in F} N(f)$. This allows for the providing of a form of guarantee on perfect predictive equivalence with significant real-world storage cost reduction. If the anomaly detection algorithm $\mathcal{M}$ requires or involves features F, all of which are decomposable, then, perfect predictive equivalence can be achieved by storing only the necessary statistics F' of the leaf subgroups in the leaf-level replay storage.

The following are further embodiments regarding applicability to different data statistics. One sample statistic that can be used to derive any sufficient statistic is the set of user data samples themselves (e.g., the full raw dataset is stored). However, due to storage cost, such algorithms cannot necessarily be supported that involve ingesting all the samples. The following are further details regarding commonly used sample statistics and characterization of their decomposability and applicability to embodiments of the multidimensional telemetry summarization and retrieval framework described herein.

In some embodiments, the mean of any parent subgroup can be calculated by using the count and sum of children subgroups which are self-decomposable. Therefore, the mean for any subgroup can be supported. The median of the subgroup population cannot necessarily be accurately calculated without all the samples. Reliable approximation algorithms that involve storing frequency values of histograms of the samples can be used. Similar techniques can also be used to approximate estimates of sample quantiles and percentiles. Variance and standard deviation of a sample can be estimated from the mean, count, and sum of squares, all of which are decomposable. Similarly, in some embodiments, higher-order moments can be calculated by tracking the sum of sample values raised to appropriate exponents. Similar to median and quartiles, it may be difficult to accurately estimate the interquartile range. In some embodiments, approximate estimates of quartiles are leveraged. Since maximum and minimum are self-decomposable statistics, the range can be accurately estimated. Many standard benchmarks for standard temporal anomaly detection do not make any assumptions on the type of features used for generating the timeseries, or use simple statistics such as mean or sum of observations from a group of sensors.

Figure 5:
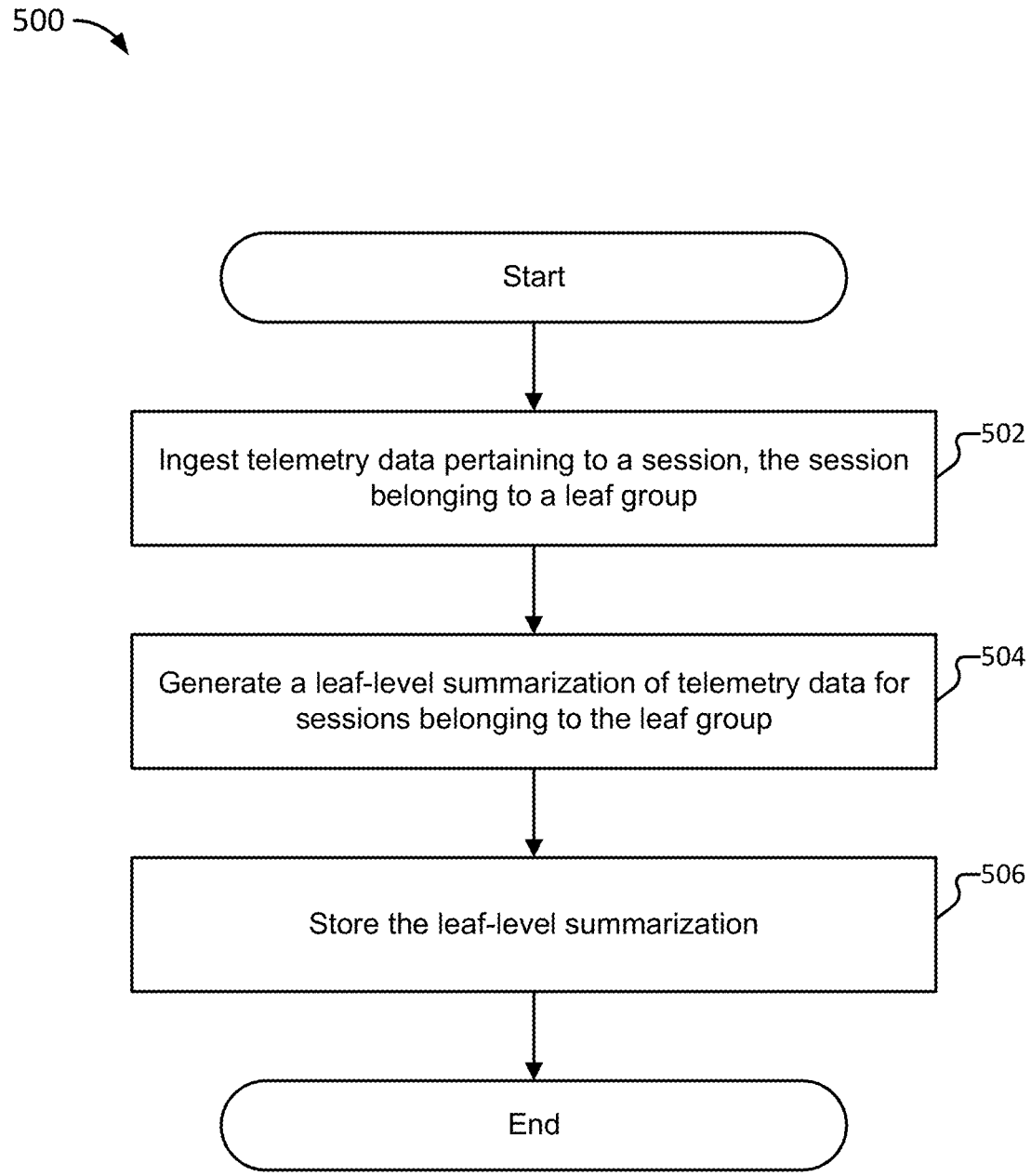
FIG. 5 is a flow diagram illustrating an embodiment of a process for generating leaf-level summarizations for timeseries analytics.

FIG. 5 is a flow diagram illustrating an embodiment of a process for generating leaf-level summarizations for timeseries analytics. In some embodiments, process 500 is executed by ingestion processing engine 108 of platform 100 of FIG. 1. The process begins at 502, when telemetry data pertaining to a session is ingested. The session is associated with a timestep (epoch) and a combination of attribute values. The session belongs to a leaf group corresponding to the combination of attribute values.

At 504, a leaf-level summarization is generated for the leaf group. The leaf-level summarization includes a summarization of telemetry data for sessions that belong to the leaf group. For example, generating the summarization includes aggregating telemetry data of individual sessions that belong to the leaf group and that also belong to the timestep. In some embodiments, the summarization includes a statistic (e.g., sum, count, mean) on the aggregated telemetry data. In some embodiments, the statistic is decomposable.

At 506, the leaf-level summarization is stored to a leaf-level data store. In some embodiments, the leaf-level summarizations are retained for use during a subsequent data retrieval stage to determine input to provide to a timeseries analytics task. For example, a leaf-level store is accessed as part of process 600 of FIG. 6. In some embodiments, the leaf-level data store resides in-memory of a single compute node.

Figure 6:
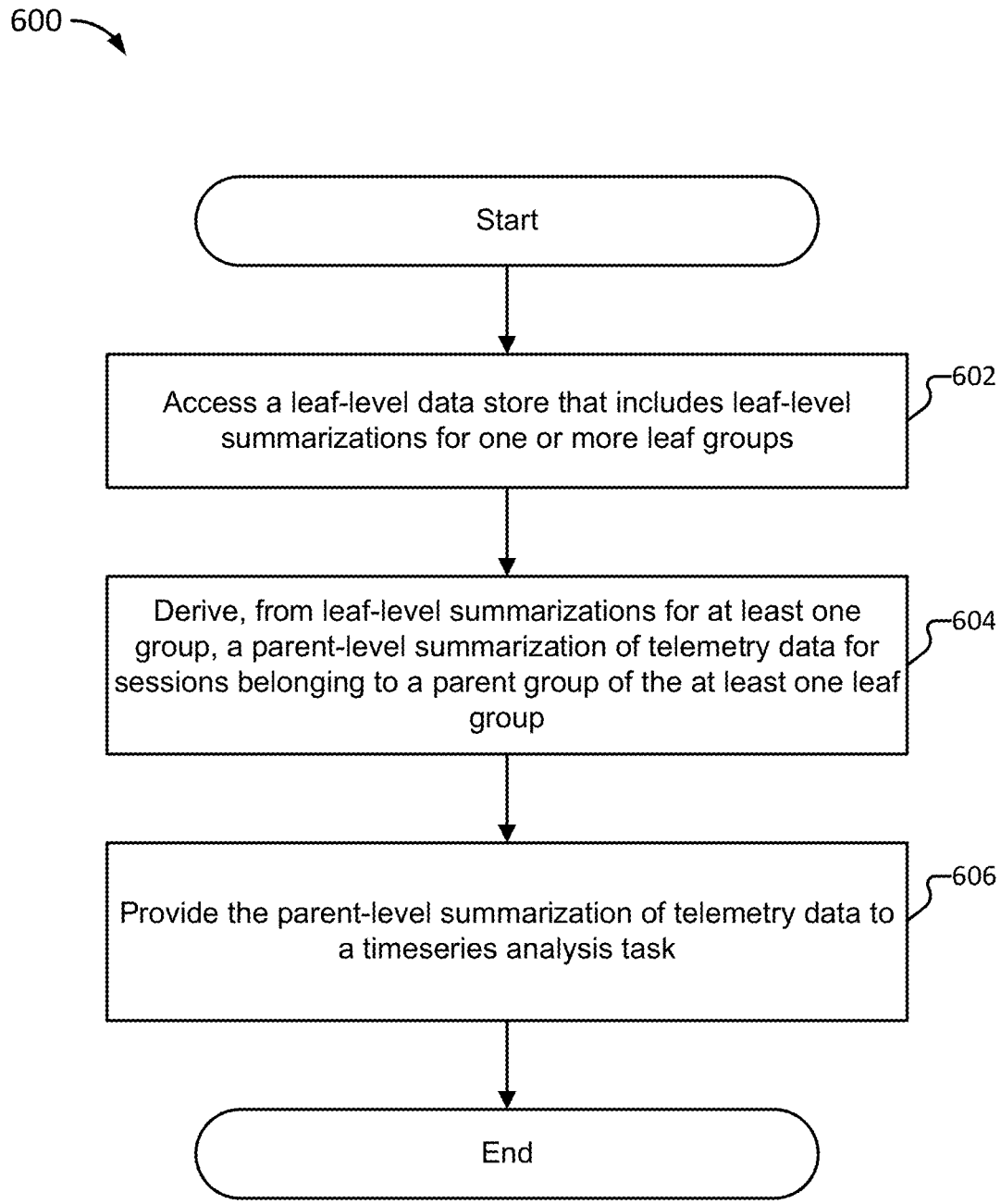
FIG. 6 is a flow diagram illustrating an embodiment of a process for retrieving parent-level summarizations from leaf-level summarizations for timeseries analytics.

FIG. 6 is a flow diagram illustrating an embodiment of a process for retrieving parent-level summarizations from leaf-level summarizations for timeseries analytics. In some embodiments, process 600 is executed by query processing engine 122 of platform 100 of FIG. 1. The process begins at 602, when a leaf-level data store is accessed. The leaf-level data store includes summarizations for one or more leaf groups. In some embodiments, the leaf-level summarizations were previously generated during an ingestion stage, such as by using process 500 of FIG. 5.

At 604, a parent-level summarization of telemetry data for sessions belonging to a parent group of at least one leaf group that is a child of the parent is derived from leaf-level summarizations of the at least one leaf group.

At 606, the parent-level summarization is provided as input to a timeseries analysis task. Examples of timeseries analytics tasks include forecasting, prediction, anomaly detection, etc. The timeseries analysis task can include both real time analysis, as well as retrospective analysis.

As described above, timeseries problems in operational settings present unique challenges: high data volumes, high cardinality of dimensions, and a world where change is the norm not the exception. Despite significant advances in modern "big data" and data processing systems, practitioners today are forced to make untenable tradeoffs between cost and fidelity in tasks such as retrospective analytics; e.g., to test out new algorithms, support new configuration requests from users, or retuning parameters. Embodiments of the techniques for multi-dimensional data ingestion, retention, and retrieval described herein provide a solution to this problem.

Embodiments of the techniques for multi-dimensional data ingestion, retention, and retrieval described herein provide improvements over existing data processing solutions, such as providing predictive equivalence for future timeseries analysis tasks, while also providing low total cost of ownership (with respect to compute cost for ingest/retrieval, and lower storage/retention footprint).

Existing solutions face a tradeoff, and while they may provide one of predictive equivalence or low total cost of ownership, they are unable to provide both simultaneously. For example, existing "precise" techniques include processing workflows leveraged by data warehouse/database style solutions such as Apache Spark, Clickhouse, etc. that either store the full raw user data, or only the relevant output or features involved in a particular analysis technique. The storage of the full-raw user data requires exorbitant storage, and is typically infeasible, in spite of lossless compression techniques that may be used by these databases. For example, in the context of video analytics, gigabytes or terabytes of data may be digested or ingested each minute, but can only be stored for a few hours or days. Further, there may be retention and compliance limits that may prevent the storage of raw user data without aggregation.

As another example, "approximate" data processing workflows include those that estimate statistics relevant to analysis tasks from the raw data when ingesting the raw data in real time. For example, some existing systems leverage universal sketches to retrieve estimates of useful statistics such as mean, top hitter, etc. Multi-level hashing may also be used to store and retrieve sketches for each of the user groups. Other existing solutions use approximate algorithms to compute distinct elements, histograms, etc. While such existing solutions can provide savings in storage costs, they have several drawbacks. For example, due to the approximate nature of their estimates, predictive equivalence is not guaranteed, especially for sample-poor user groups and scenarios. As another example, the computational cost and time involved in performing these approximations can make these existing solutions infeasible in ingesting large, high-dimensional datasets with low latency and compute cost.

As shown above, in contrast to existing solutions, embodiments of the techniques for multi-dimensional data ingestion, retention, and retrieval described herein simultaneously provide for low total cost of ownership, as well as high accuracy for unforeseen tasks, despite the unique scale, cost, and unpredictability of operational timeseries settings. In this way, cost-effectiveness and predictive equivalence/accuracy at scale are both achieved.

Embodiments of the techniques for multi-dimensional data ingestion, retention, and retrieval described herein provide an improvement over existing systems by achieving both cost efficiency and perfect accuracy. In various embodiments, this is achieved by leveraging structural characteristics of the data, query workloads, and modern analytical databases. Using the techniques described herein facilitates new capabilities that advance the state of practice; e.g., for more rigorous longitudinal testing, longitudinal data-driven model/parameter exploration, as well as new product features for users to explore and use timeseries algorithms.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
one or more processors configured to:
temporarily store, in a session-level epoch store, ingested telemetry data pertaining to a plurality of individual sessions for a time-step, wherein each session is annotated with a combination of attribute values;
generate a leaf-level epoch store for the time-step, wherein generating the leaf-level epoch store for the time-step comprises generating leaf-level summarizations for leaf groups present for the time-step in the session-level epoch store, and wherein generating a leaf-level summarization for a leaf group comprises:
grouping together sessions in the session-level epoch store that share a same combination of attribute values into the leaf group; and
aggregating a portion of the telemetry data pertaining to the sessions grouped together into the leaf group that share the same combination of attribute values;
flush the session-level epoch store of the telemetry data pertaining to the plurality of individual sessions for the time-step, wherein ingested session-level telemetry data pertaining to a next time-step is subsequently stored in the session-level epoch store; and
retain the leaf-level epoch store generated for the time-step; and
a memory coupled to the one or more processors and configured to provide the one or more processors with instructions.

2. The system recited in claim 1, wherein the leaf-level epoch store resides in-memory on a single compute node.

3. The system recited in claim 1, wherein a parent-level summarization of telemetry data for a parent group of sessions is derivable from leaf-level summarizations for leaf groups that are children of the parent group.

4. The system recited in claim 1, wherein generating the leaf-level summarization comprises determining a decomposable statistic based at least in part on the portion of the telemetry data pertaining to the sessions grouped together into the leaf group.

5. The system recited in claim 1, wherein the leaf-level epoch store is retained for subsequent accessing during a data retrieval stage to determine input to provide to a timeseries analysis task.

6. A method, comprising:
temporarily storing, in a session-level epoch store, ingested telemetry data pertaining to a plurality of individual sessions for a time-step, wherein each session is annotated with a combination of attribute values;

generating a leaf-level epoch store for the time-step, wherein generating the leaf-level epoch store for the time-step comprises generating leaf-level summarizations for leaf groups present for the time-step in the session-level epoch store, and wherein generating a leaf-level summarization for a leaf group comprises:

grouping together sessions in the session-level epoch store that share a same combination of attribute values into the leaf group; and aggregating a portion of the telemetry data pertaining to the sessions grouped together into the leaf group that share the same combination of attribute values;

flushing the session-level epoch store of the telemetry data pertaining to the plurality of individual sessions for the time-step, wherein ingested session-level telemetry data pertaining to a next time-step is subsequently stored in the session-level epoch store; and retaining the leaf-level epoch store generated for the time-step.

7. The method of claim 6, wherein the leaf-level epoch store resides in-memory on a single compute node.

8. The method of claim 6, wherein a parent-level summarization of telemetry data for a parent group of sessions is derivable from leaf-level summarizations for leaf groups that are children of the parent group.

9. The method of claim 6, wherein generating the leaf-level summarization comprises determining a decomposable statistic based at least in part on the portion of the telemetry data pertaining to the sessions grouped together into the leaf group.

10. The method of claim 6, wherein the leaf-level epoch store is retained for subsequent accessing during a data retrieval stage to determine input to provide to a timeseries analysis task.

11. A system, comprising:
one or more processors configured to:
access a retained leaf-level epoch store that was previously generated for a time-step, wherein the leaf-level epoch store comprises leaf-level summarizations generated for leaf groups present for the time-step, and wherein a leaf-level summarization for a leaf group was generated at least in part by:
grouping together sessions in a session-level epoch store that share a same combination of attribute values into the leaf group, wherein ingested telemetry data pertaining to a plurality of individual sessions for the time-step was temporarily stored in the session-level epoch store, and wherein each session was annotated with a combination of attribute values; and
aggregating a portion of the telemetry data pertaining to the sessions grouped together into the leaf group that share the same combination of attribute values, wherein the session-level epoch store was flushed of the telemetry data pertaining to the plurality of individual sessions for the time-step, and wherein ingested session-level telemetry data pertaining to a next time-step was subsequently stored in the session-level epoch store;

derive, from leaf-level summarizations for at least one leaf group, a parent-level summarization of telemetry data for sessions comprised in a parent group of the at least one leaf group and that are associated with the time-step; and provide the parent-level summarization of telemetry data as input to a timeseries analysis task; and a memory coupled to the one or more processors and configured to provide the one or more processors with instructions.

12. The system recited in claim 11, wherein the leaf-level epoch store resides in-memory on a single compute node.

13. The system recited in claim 11, wherein the deriving is performed using a CUBE operation.

14. The system recited in claim 11, wherein the timeseries analysis task comprises retrospective analysis.

15. A method, comprising:
accessing a retained leaf-level epoch store that was previously generated for a time-step, wherein the leaf-level epoch store comprises leaf-level summarizations generated for leaf groups present for the time-step, and wherein a leaf-level summarization for a leaf group was generated at least in part by:
grouping together sessions in a session-level epoch store that share a same combination of attribute values into the leaf group, wherein ingested telemetry data pertaining to a plurality of individual sessions for the time-step was temporarily stored in the session-level epoch store, and wherein each session was annotated with a combination of attribute values; and
aggregating a portion of the telemetry data pertaining to the sessions grouped together into the leaf group that share the same combination of attribute values, wherein the session-level epoch store was flushed of the telemetry data pertaining to the plurality of individual sessions for the time-step, and wherein ingested session-level telemetry data pertaining to a next time-step was subsequently stored in the session-level epoch store;

deriving, from leaf-level summarizations for at least one leaf group, a parent-level summarization of telemetry data for sessions comprised in a parent group of the at least one leaf group and that are associated with the time-step; and providing the parent-level summarization of telemetry data as input to a timeseries analysis task.

16. The method of claim 15, wherein the leaf-level epoch store resides in-memory on a single compute node.

17. The method of claim 15, wherein the deriving is performed using a CUBE operation.

18. The method of claim 15, wherein the timeseries analysis task comprises retrospective analysis.

* * * * *